(12) United States Patent
Mamidala et al.

(10) Patent No.: US 8,904,118 B2
(45) Date of Patent: *Dec. 2, 2014

(54) MECHANISMS FOR EFFICIENT INTRA-DIE/INTRA-CHIP COLLECTIVE MESSAGING

(75) Inventors: Amith R. Mamidala, Yorktown Heights, NY (US); Valentina Salapura, Chappaqua, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 272 days.

This patent is subject to a terminal disclaimer.

(21) Appl. No.: 12/986,528

(22) Filed: Jan. 7, 2011

(65) Prior Publication Data

US 2012/0179879 A1    Jul. 12, 2012

(51) Int. Cl.
*G06F 12/10*    (2006.01)
*G06F 12/08*    (2006.01)
*G06F 15/167*    (2006.01)

(52) U.S. Cl.
CPC .......... *G06F 12/0831* (2013.01); *G06F 15/167* (2013.01)
USPC ....................................... 711/147

(58) Field of Classification Search
USPC ....................................... 711/147
See application file for complete search history.

(56) References Cited

U.S. PATENT DOCUMENTS

| | | |
|---|---|---|
| 5,434,995 A | 7/1995 | Oberlin et al. |
| 5,490,261 A | 2/1996 | Bean et al. |
| 5,706,464 A | 1/1998 | Moore et al. |
| 5,721,921 A | 2/1998 | Kessler et al. |
| 5,790,530 A | 8/1998 | Moh et al. |
| 5,812,811 A | 9/1998 | Dubey et al. |
| 5,928,351 A | 7/1999 | Horie et al. |
| 5,937,194 A * | 8/1999 | Sundaresan ................... 717/119 |
| 6,047,316 A | 4/2000 | Barton et al. |
| 6,549,989 B1 | 4/2003 | Arimilli et al. |
| 6,988,170 B2 | 1/2006 | Barroso et al. |
| 7,100,021 B1 | 8/2006 | Marshall et al. |
| 7,200,717 B2 | 4/2007 | Guthrie et al. |
| 7,454,570 B2 | 11/2008 | Dunshea et al. |
| 7,657,880 B2 | 2/2010 | Wang et al. |

(Continued)

FOREIGN PATENT DOCUMENTS

| | | |
|---|---|---|
| JP | 2000215182 A | 8/2000 |
| WO | 96/37834 | 11/1996 |

OTHER PUBLICATIONS

International Search Report mailed Mar. 27, 2012 in corresponding International Application No. PCT/US2011/061683.

(Continued)

*Primary Examiner* — Kenneth Lo
(74) *Attorney, Agent, or Firm* — Scully, Scott, Murphy & Presser, P.C.; Daniel P. Morris, Esq.

(57) ABSTRACT

Mechanism of efficient intra-die collective processing across the nodelets with separate shared memory coherency domains is provided. An integrated circuit die may include a hardware collective unit implemented on the integrated circuit die. A plurality of cores on the integrated circuit die is grouped into a plurality of shared memory coherence domains. Each of the plurality of shared memory coherence domains is connected to the collective unit for performing collective operations between the plurality of shared memory coherence domains.

4 Claims, 5 Drawing Sheets

(56) References Cited

U.S. PATENT DOCUMENTS

| | | |
|---|---|---|
| 7,673,011 B2 | 3/2010 | Archer et al. |
| 7,721,009 B2 | 5/2010 | Moreira et al. |
| 7,734,706 B2 | 6/2010 | Archer et al. |
| 7,793,044 B1 | 9/2010 | Spracklen et al. |
| 8,307,194 B1 | 11/2012 | Scott et al. |
| 2002/0147872 A1 | 10/2002 | Steele et al. |
| 2002/0174299 A1 | 11/2002 | Hayter et al. |
| 2004/0078493 A1 | 4/2004 | Blumrich et al. |
| 2004/0154010 A1 | 8/2004 | Marcuello et al. |
| 2004/0154011 A1 | 8/2004 | Wang et al. |
| 2005/0027941 A1 | 2/2005 | Wang et al. |
| 2005/0097300 A1 | 5/2005 | Gildea et al. |
| 2006/0161741 A1 | 7/2006 | Yasue et al. |
| 2006/0184771 A1 | 8/2006 | Floyd et al. |
| 2007/0006047 A1 | 1/2007 | Zhou et al. |
| 2007/0174558 A1 | 7/2007 | Jia et al. |
| 2007/0180310 A1 | 8/2007 | Johnson et al. |
| 2008/0077921 A1 | 3/2008 | Chaudhary et al. |
| 2008/0178177 A1 | 7/2008 | Archer et al. |
| 2008/0215861 A1 | 9/2008 | Aamodt et al. |
| 2008/0282032 A1 | 11/2008 | Shen et al. |
| 2008/0282064 A1 | 11/2008 | Day et al. |
| 2008/0288750 A1 | 11/2008 | Clift et al. |
| 2009/0055627 A1 | 2/2009 | Giacomoni et al. |
| 2009/0063811 A1 | 3/2009 | Arimilli et al. |
| 2009/0070617 A1 | 3/2009 | Arimilli et al. |
| 2009/0083493 A1* | 3/2009 | Kinter .................... 711/141 |
| 2009/0172306 A1 | 7/2009 | Nussbaum et al. |
| 2009/0193228 A1 | 7/2009 | Kasahara et al. |
| 2009/0282474 A1 | 11/2009 | Chen et al. |
| 2010/0088472 A1 | 4/2010 | Ukai |

OTHER PUBLICATIONS

Prvulovic et al., ReEnact: using thread-level speculation mechanisms to debug data races in multithreaded codes, May 2003, ACM, Proceedings of the30th annual international symposium on Computer architecture, pp. 110-121 (reprinted pp. 1-12).

Prvulovic et al., ReVive: Cost-Effective Architectural Support for Rollback Recovery in Shared-Memory Multiprocessors, May 2002, ISCA '02 Proceedings of the 29th annual international symposium on Computer architecture, pp. 111-122.

Mukherjee et al., Detailed design and evaluation of redundant multithreading alternatives, May 2002, ISCA '02 Proceedings of the 29th annual international symposium on Computer architecture, pp. 99-110.

Torrellas, Hardware Support for Reliability, 2003, University of Illinois at Urbana-Champaign, Engineering, Course Material, CS 533, pp. 1-34.

U.S. Office Action mailed in related U.S. Appl. No. 13/020,228 on Apr. 30, 2013.

U.S. Office Action mailed in related U.S. Appl. No. 13/008,498 on Mar. 7, 2013.

Nightingale et al., Parallelizing security checks on commodity hardware, Proceedings of the 2008 International Conference on Architectural Support for Programming Languages and Operating Systems (ASPLOS), Mar. 1-5, 2008, pp. 308-318, URL http://www.eecs.umich.edu/~pmchen/papers/nightingale08.pdf.

Oplinger, Enhancing Software Reliability with Speculative Threads, Aug. 2004, pp. 1-111.

Li et al., Speculative Parallel Threading Architecture and Compilation, International Conference on Parallel Processing Workshops (ICPPW'05), Jun. 14-17, 2005, pp. 285-294.

Bolotin et al., The Power of Priority: NoC based Distributed Cache Coherency, Electrical Engineering Department, Technicon—Israel Institute of Technology (Haifa 32000, Isreal), May 7-9, 2007, pp. 1-10.

Lin et al., A Low-Complexity Synchronization Based Cache Coherence Solution for Many Cores, IEEE Ninth International Conference on Computer and Information Technology, Oct. 11-14, 2009, pp. 69-75, DOI 10.1109/CIT.2009.100.

Huang et al., Architecture Supported Synchronization-Based Cache Coherence Protocol for Many-Core Processors, Institute of Computing Technology, Chinese Academy of Sciences, Jun. 2008, pp. 1-3, Beijing, China.

Santhanaraman Al., Natively Supporting True One-sided Communication in MPI on Multi-core Systems with InfiniBand, 9th IEEE/ACM International Symposium on Cluster Computing and the Grid, May 18-21, 2009, pp. 380-387.

Kontothanassis et al., Software Cache Coherence for Large Scale Multiprocessors, IP Accession No. N95-16113, Report No. AD-A281628, TR-513, Contract: N00014-92-J-1801; ARPA Order 8930, Jul. 1994, pp. 1-20.

Dios et al., Speeding-up Synchronizations in DSM Multiprocessors, Euro-Par 2006 Parallel Processing—12th International Euro-Par Conference, Proceedings, Lecture Notes in Computer Science (including subseries Lecture Notes in Artificial Intelligence and Lecture Notes in Bioformatics) (Lect. Notes Comput. Sci.), Aug. 28-Sep. 1, 2006, pp. 473-484, Germany.

Narayanaswamy, G., et al., Impact of Network Sharing in Multi-Core Architectures, Computer Communications and Networks, 2008. ICCCN '08. Proceedings of 17th International Conference on Digital Object Identifier: 10.1109/ICCCN.2008.ECP.61, Aug. 3-7, 2008, pp. 1-6.

Huang, W., et al., Efficient one-copy MPI shared memory communication in Virtual Machines, Cluster Computing, 2008 IEEE International Conference on Digital Object Identifier: 10.1109/CLUSTR.2008.4663761, Sep. 29, 2008-Oct. 1, 2008, pp. 107-115.

Moreaud, S. et al., Optimizing MPI communication within large multicore nodes with kernel assistance, Parallel & Distributed Processing, Workshops and Phd Forum (IPDPSW), 2010 IEEE International Symposium on Digital Object Identifier: 10.1109/IPDPSW.2010.5470849, Apr. 19-23, 2010, pp. 1-7.

Rabenseifner, R. et al., Hybrid MPI/OpenMP Parallel Programming on Clusters of Multi-Core SMP Nodes, Parallel, Distributed and Network-based Processing, 2009 17th Euromicro International Conference on Digital Object Identifier: 10.1109/PDP.2009.43, Feb. 18-20, 2009, pp. 427-436.

Opilnger et al., Enhancing Software Reliability with Speculative Threads, ASPLOS X Proceedings of the 10th international conference on Architectural support for programming languages and operating systems, Dec. 2002, pp. 184-196, San Jose, CA.

Office Action dated Feb. 4, 2014 received in a related U.S. Patent Application, namely U.S. Appl. No. 12/987,523.

Pjesivac-Grbovic et al., Performance analysis of MPI collective operations, Mar. 15, 2007, Science Business Media LLC, p. 127-143.

U.S. Official Action mailed Jul. 23, 2013 in related U.S. Appl. No. 13/611,985.

Office Action dated Mar. 14, 2014 received in related U.S. Patent Application, namely U.S. Appl. No. 13/020,228.

\* cited by examiner

MECHANISMS FOR EFFICIENT INTRA-DIE/INTRA-CHIP COLLECTIVE MESSAGING

FIELD

The present application generally relates to computer architecture and more particularly to collective messaging in semiconductor chips or die.

BACKGROUND

High performance computing systems based on multi-core architecture have multi-core integrated circuit dies (chips) connected by a network infrastructure. Communications between/among the processes running on the cores occur both within a node (intra-node communication) and between the nodes (inter-node communication). Message Passing Interface (MPI) is a communication protocol used for process communications, for example, in parallel programming. MPI provides collective operations used for synchronization and communication among processes. Software that implement MPI in high performance computing systems utilize the network technology for communicating between processes that reside on different physical nodes, while using shared memory for communicating between processes on different cores within the same node.

As the chip technology becomes more complex, for example, as more and more cores are allocated on a chip in the current multi-core architecture, maintaining of communication and coherence among the cores within the chip as well as outside the chip require additional work and become burdensome to shared resources.

BRIEF SUMMARY

Mechanisms for efficient intra-die/intra-chip collective messaging may be provided. In one aspect, an intra-die collective messaging device may include a collective unit on an integrated circuit die and a plurality of shared memory coherence domains on the integrated circuit die. Each coherence domain may include a plurality of cores and shared memory for communication between the plurality of cores within the coherence domain. Each of the plurality of shared memory coherence domains may be connected to the collective unit for performing collective operations between the plurality of shared memory coherence domains.

In another aspect, a computer system may include multiple cores per integrated circuit die grouped into at least two nodelets of cores, each nodelet being a shared memory coherence domain. The computer system may also include a collective unit comprising a set of buffers, mathematical and logical reduce logic, and a broadcast device. A connection may be provided between the collective unit and each nodelet. Operation control configuration logic may be provided for configuring the collective unit, wherein the collective unit performs a collective operation based on data received from the nodelets and according to configurations of the operation control configuration logic.

Yet in another aspect, a method for intra-die collective messaging may include a plurality of shared memory coherence domains on an integrated circuit die communicating with one another using a hardware collective unit implemented on the integrated circuit die. The method may also include configuring said hardware collective unit using an operation control configuration logic associated with the hardware collective unit. The method may further include performing a collective operation based on data received form the plurality of shared memory coherence domains according to the control configuration logic.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one embodiment of the present disclosure, collective messaging mechanisms for communicating among a plurality of cores within an integrated circuit die (also referred to as a chip or a node) are presented. A chip that includes the collective messaging mechanism of the present disclosure in one embodiment may be part of a network infrastructure that makes up a high performance computing system such as a supercomputer. A collective unit placed on a chip allows for communications between/among a plurality of cores (threads or processes running on the cores) within the same chip. In one embodiment of the present disclosure, an integrated circuit die (a chip) includes multiple cores grouped into shared coherence domains, referred to as nodelets. The collective messaging mechanisms of the present disclosure in one embodiment provide for efficient collective operations between/among the nodelets within a chip.

Figure 1:
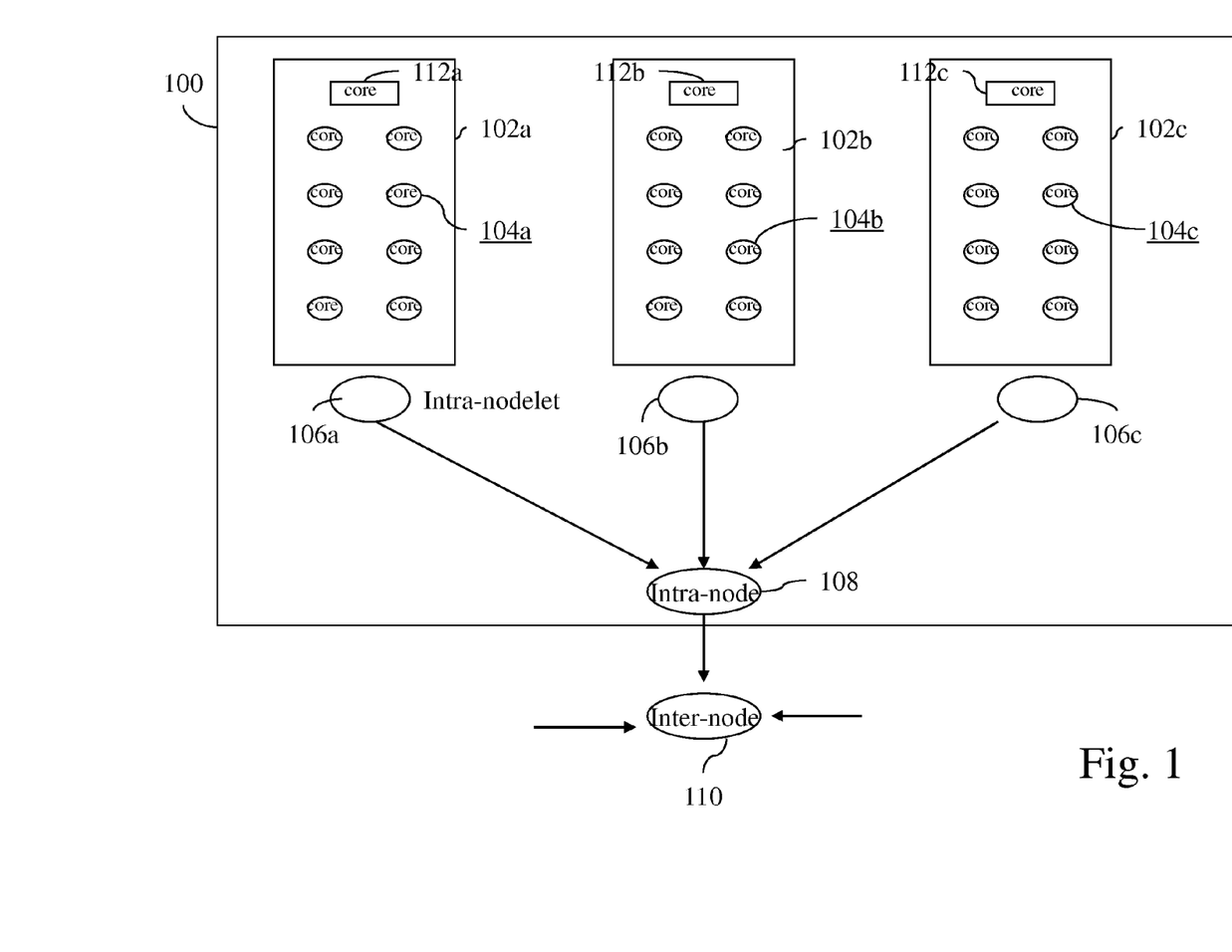
FIG. 1 illustrates multi-core computer architecture with three-level hierarchy in one embodiment of the present disclosure.

FIG. 1 illustrates multi-core computer architecture with three-level hierarchy in one embodiment of the present disclosure. This figure shows an embodiment in which shared memory may be used for intra-nodelet communication (e.g., $1^{st}$ level), i.e., communication between/among the cores in the same nodelet; a collective unit may be used for intra-node communication (e.g., $2^{nd}$ level), i.e., communication between/among the nodelets in the same chip; and network collectives may be used for inter-node communication (e.g., $3^{rd}$ level), i.e., communication between different chips. An integrated circuit die (chip) 100 may include a plurality of nodelets 102a, 102b, 102c. Nodelets are individual coherence domains within the chip 100. Nodelets comprise a plurality of cores. For instance, a nodelet shown at 102a includes a plurality of cores 104a, 112b. Briefly, a core is an independent logical execution unit. A core may have functional units and L1 cache. The elements 112a, 112b, 112c and 104a, 104b, 104c correspond to cores (also referred to as compute cores). These cores can be divided into two broad classes. FIG. 1 illustrates that the chips can be heterogeneous in nature comprising of cores with differing processing capability (e.g., shown by rectangle 112a and oval 104a). The elements 106a, 106b, 106c, represent both a) the data flow (data path) between the total chip and the network, and b) also any logic or devices that support or enable such data flows. The element 108 represents the result or the logic holding the result which is then transferred to an external network, 110.

The cores within the same nodelet communicate with one another and produce an intra-nodelet result. For instance, the cores shown at 104a in the nodelet shown at 102a produce an intra-nodelet result shown at 106a. Likewise, the cores shown at 104b in the nodelet shown at 102b produce an intra-nodelet result shown at 106b. Similarly, the cores shown at 104c in the nodelet shown at 102c produce an intra-nodelet result shown at 106c. Intra-node communication in this embodiment may be performed using shared memory associated with each nodelet.

The cores may communicate with each other using the standard techniques for communication within a coherency domain. Coherency domain refers to a group of cores sharing memory using techniques such that the cores' individual local memories are consistent with the share memory. An optimal method is using shared memory which is visible to the processes running on the cores within a nodelet.

In one embodiment of the present disclosure, the nodelets 102a, 102b, 102c communicate with one another (intra-node communication) via a collective unit within the chip 100. For example, the element 108 may be a collective unit that combines the results from each nodelet (106a, 106b, 106c). The combined result may be communicated outside the chip 100 to the network 110, for example, for inter-node communication.

The collectives or collective functions of the present disclosure in one embodiment may include "allreduce", "broadcast", "reduce", "barrier" operations, and other MPI collective operations. Barrier operation is used to synchronize a group of processes. Broadcast operation distributes data (message) from a process to all processes in the participating group. Reduce operation combines the data provided by all participating processes and returns the combined value to a process. Allreduce operation combines the data from all processes and returns the resulting value to all participating processes. Both short messages (e.g., 8 bytes) and long messages (e.g., 30 kilobytes or more) may be supported in the present disclosure for performing the collective operations. A collective unit placed on a chip for communicating among different nodelets (coherence domains) on the same chip optimizes communication latency and bandwidth in a multi-core multi-node system. Further, the collectives of the present disclosure in one embodiment support non-blocking collective operations (i.e., an application can issue many operations at once and then wait for all the operations to finish, thus allowing many operations to be in progress simultaneously) and allows for overlap of computation and communication by offloading collective operations.

Figure 2:
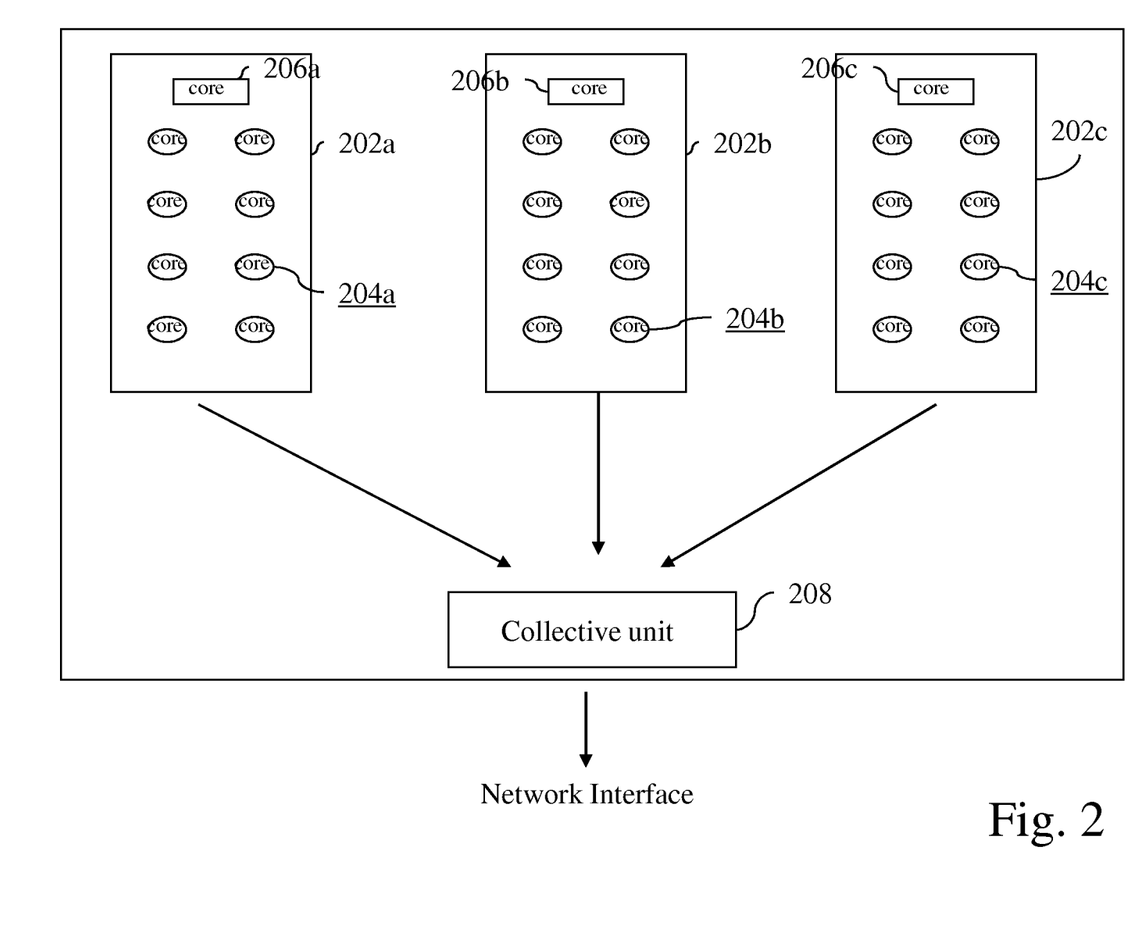
FIG. 2 shows multi-core computer architecture with three-level hierarchy in one embodiment of the present disclosure.

FIG. 2 shows multi-core computer architecture with two-level hierarchy in one embodiment of the present disclosure. In this embodiment, a hardware mechanism of communicating among the cores within a chip 200 without shared memory within the chip is provided. More specifically, a hardware mechanism of doing collective communication without shared memory among the cores and also interfacing with the external network is provided. The cores on a chip (204a, 204b, 204c) are grouped as nodelets (202a, 202b, 202c). A collective unit (CU) 208 is used to communicate information from multiple nodelets to a network interface. An interface to the CU 208 may be implemented such that an application need not be aware of the specific hardware implementation. There may be separate first-in-first-out (FIFO) queues for operation in the CU 208. An application middleware may decide which FIFO queue to use, whether the CU's FIFO queue or the network's FIFO queue.

In FIG. 1, a CU (108) was shown to operate upon the results from each of the nodelets. The individual cores would operate upon data in their respective nodelets before handing over the operation to CU (108). In FIG. 2, a CU (208) would operate on the entire data. The individual cores would only post the collective descriptors and handover the entire operation to CU (208).

The CU logically may provide the same interface as that of the network. The interface allows the application entities such as processes or threads to post the collective operation by means of a collective descriptor. The collective descriptor can include a) the type of the operation, e.g., reduce, broadcast, etc.; b) root of the collective (e.g., the process identifier (id) where the data is to be "reduced to" or "broadcasted from"; c) amount of data that is to be operated upon; d) type of the data; e) any application specific context information, e.g., what are all the processes/threads that are participating in the operation and to which logical communication channel they are bound to. The pointer to the data which is used as the input to the operation may be also included in the descriptor. However, the result of the operation can be placed in a separate reception FIFO or directly in the application buffer.

The CU (208) processes the descriptor and starts the operation. The CU (208) would process the descriptors in a non-blocking manner, i.e., it may not choose to wait until the previous operation is over before starting the next one. This is important to meet the non-blocking semantics of the MPI standard.

In one embodiment, a broadcast logic using a collective unit may have a collective network delivering a packet to one of the processes, referred to as the master or leader. The process can be on any of the cores (e.g., 206a, 204a) on the nodelet (e.g., 202a), it is up to the application executing on the cores which core it wants to map the process to. The master can use shared memory communication within the nodelet to broadcast data to all the cores in its nodelet. In another embodiment the master may use the CU (208) for all the transfers. The master uses the collective unit to broadcast to the nodelets, i.e., for intra-node communication. In another embodiment, a collective unit may make N-way broadcast of data, i.e., a collective unit broadcasts data to individual nodelets on the chip.

Figure 3:
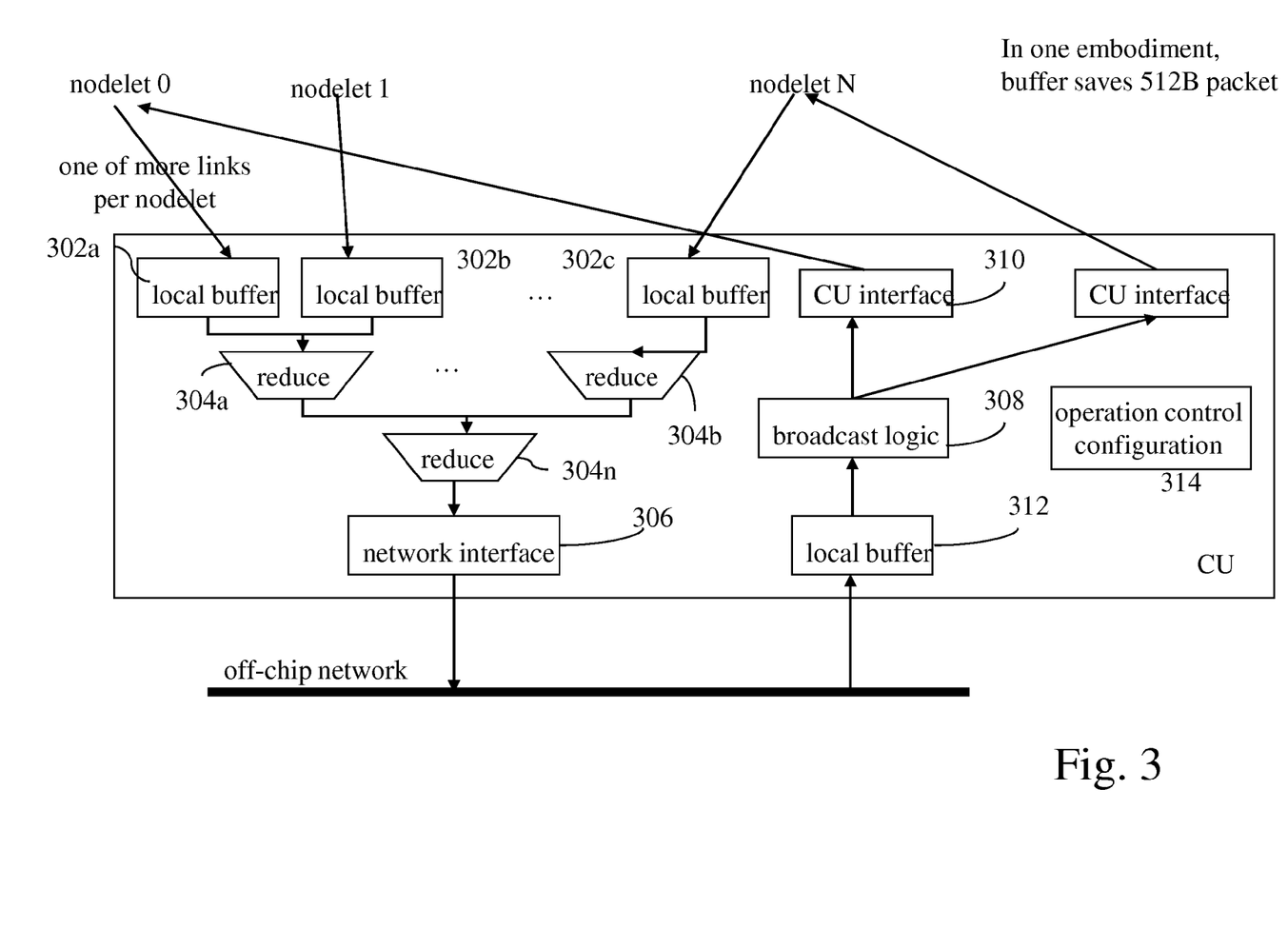
FIG. 3 illustrates a logic implementation of a collective unit in one embodiment of the present disclosure.

FIG. 3 illustrates a collective unit (CU) in one embodiment of the present disclosure. A local buffer is allocated for each nodelet on a chip. Each nodelet may write to its corresponding local buffer. The data in the local buffers (302a, 302b, 302n) are combined by the reduce function units (304a, 304b, 304n) into a single result. The buffers are a series latches which hold data until it can be input into the reduce units 304. The reduce unit may contain a series of simple ALU (Arithmetic Logic Unit) that perform logical (and, or, etc.) of arithmetic (max, sum, etc.) operations. The result is placed on a network interface 306 and sent out of the chip. Another local buffer 312 is allocated for data coming into the chip. A CU interface 310 may be linked to a nodelet. One CU interface may be implemented per nodelet. A broadcast logic 308 sends the data to each collective unit interface 310, which in turn sends the data to the corresponding nodelet. Providing the broadcast logic allows for rapid dissemination of the results back to the nodelets consistent with the CU mission of providing efficient collective operations. In another embodiment, a target identification and selection logic (not shown) can be added to either broadcast logic 308 or CU interface 310 to identify if the received data should be sent to the paired (corresponding) nodelet. Depending on the target identification result, only one or more nodelets could receive data. In yet another embodiment, the target identification logic is programmable, and configuration is selected depending on the configuration stored in the configuration registers contained within the configuration logic 314. In one embodiment, a local buffer saves 512 byte packet data.

CU may be configured using an operation control configuration logic 314. The CU in one embodiment of the present disclosure is a memory mapped device and contain a series of configuration registers that appear in the user's or system software's address space allowing writes to control how the CU is configured and reads to allow the software to know what the currently configuration is.

Both short reduce and long reduce operations may be performed using a collective unit of the present disclosure. For a short reduce operation, a descriptor may be posted to the collective unit. A descriptor can contain the data directly instead of descriptors. A collective unit of the present disclosure in one embodiment reduces the data and transfers packets to a collective network.

A long reduce operation in one embodiment of the present disclosure parallelizes reduction operations within the cores on the same chip, for example, between/among nodelets within the same chip. Different hardware units parallelize the reduction inside the node.

Figure 4:
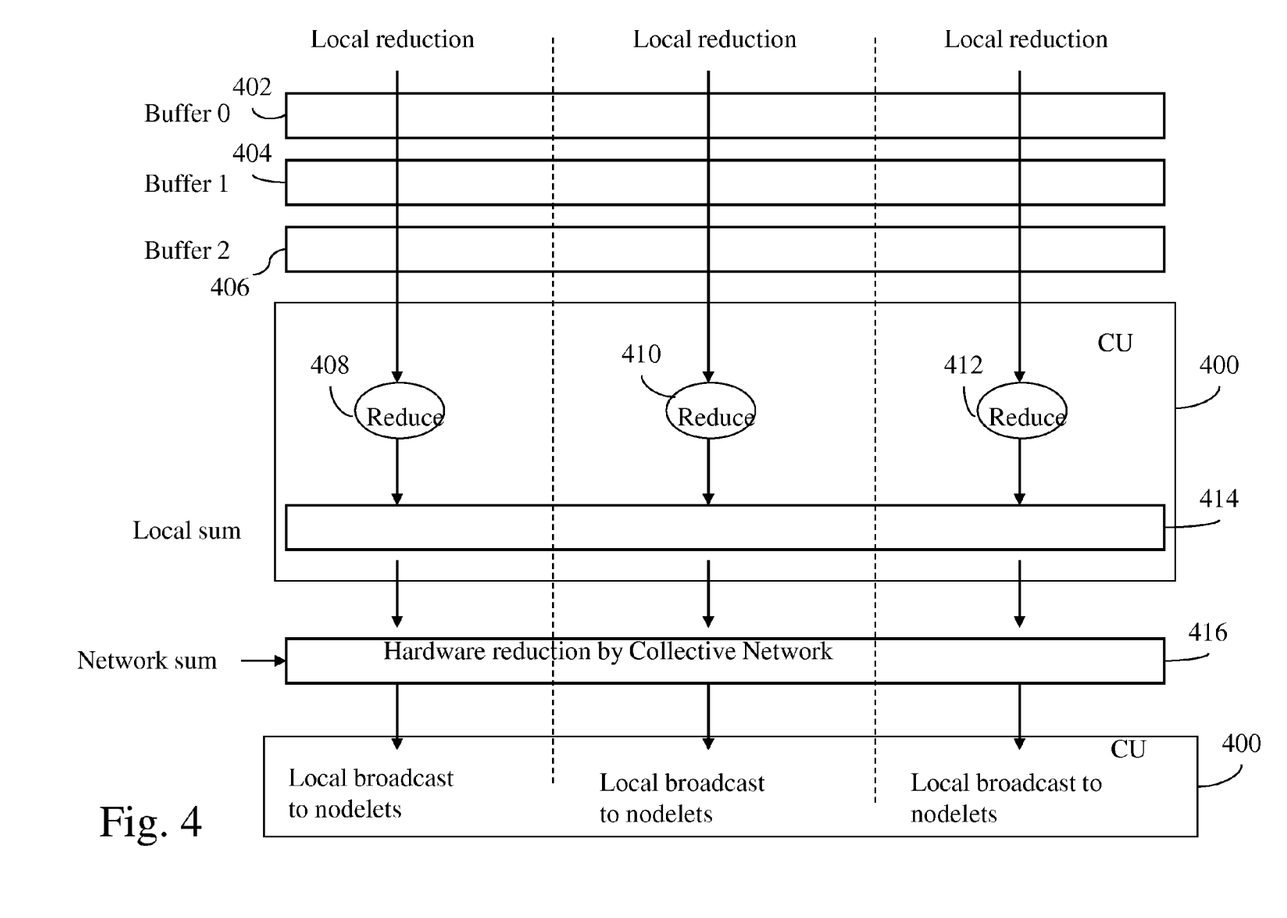
FIG. 4 shows operational semantic of a reduce operation in one embodiment of the present disclosure.

FIG. 4 illustrates a long reduce operation in one embodiment of the present disclosure. Each nodelet may place its data in a local buffer allocated for the nodelet. For example, nodelet1 places its data in buffer 0 (402), nodelet2 places its data in buffer 1 (404), and nodelet3 places its data in buffer 2 (406). In this example, nodelet1, nodelet2 and nodelet3 are coherence domains each comprising a plurality of cores. Hardware units 408, 410, 412 of the collective unit 400 perform reduction operations on different pieces of data in buffer 0, buffer 1, and buffer 2, and produce a single result, for example, a local sum 414. The local result is communicated outside the chip to a network, for example, for combining the local sum with other local sums from other chips making up a computer system. A collective network 416 may combine the data from all chips participating in the long reduce operation. The collective unit 400 receives the result from the collective network 416 and broadcasts the data to each nodelet on the chip.

In FIG. 4, 402, 404, and 406 represent the source buffers of the application whose data need to be reduced. The CU's combining logic represented by the elements 408, 410, and 412 works in parallel and reduces data streams arising from each of the source buffers, 402, 404, 406. The type of the operation and the length of the data and other parameters can be gathered from the descriptor information posted by the application. Once the local operation is done, at 414, the CU would then transfer the data to the external collective network, 416, which would then do a global combining operation across the nodes in the system. Once the global hardware reduction is done, the CU broadcasts the results to the final destination buffers.

Figure 5:
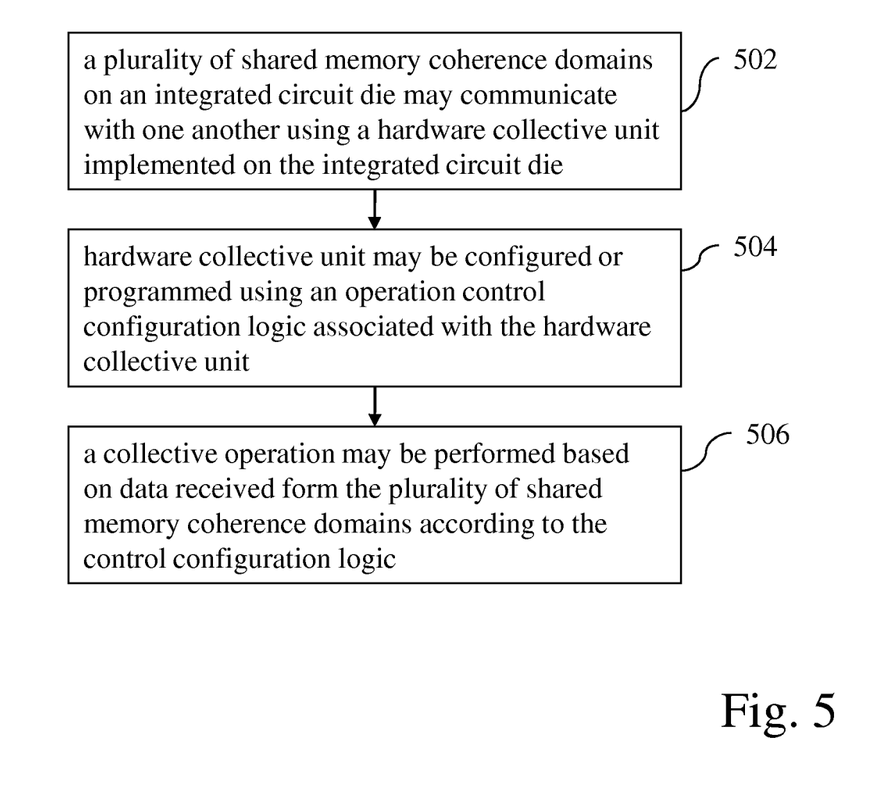
FIG. 5 is a flow diagram illustrating a method for intra-die collective messaging of the present disclosure in one embodiment.

FIG. 5 is a flow diagram illustrating a method for intra-die collective messaging of the present disclosure in one embodiment. The steps of the flow diagram may be carried out in any order and not necessarily in the order they appear. At 502, a plurality of shared memory coherence domains on an integrated circuit die may communicate with one another using a hardware collective unit implemented on the integrated circuit die. At 504, hardware collective unit may be configured or programmed using an operation control configuration logic associated with the hardware collective unit. For instance, a software application may program the control configuration logic for using it in conjunction with the collective operations the application desires to perform. At 506, a collective operation may be performed based on data received form the plurality of shared memory coherence domains according to the control configuration logic.

In one aspect, a plurality of cores in a shared memory coherence domain use shared memory and associated coherence policy to communicate data among the plurality of cores. In one aspect, the plurality of shared memory coherence domains on an integrated circuit die may communicate with one another by writing and reading data to and from corresponding data buffers in the hardware collective unit allocated respectively for the plurality of shared memory coherence domains. In another aspect, the plurality of shared memory coherence domains on an integrated circuit die may communicate with one another by having individual cores of the plurality of shared memory coherence domains write and read data to and from corresponding data buffers in the hardware collective unit allocated respectively for the plurality of shared memory coherence domains.

The methodologies disclosed herein generally provides for mechanisms of efficient intra-die collective processing across the nodelets with separate shared memory coherency domains. The methodologies in one embodiment may remove intra-node and/or nodelet traffic from the network. The methodologies may also provide programmability of different communication patterns within the nodes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for intra-die collective messaging, comprising: a plurality of shared memory coherence domains on an integrated circuit die communicating with one another using a hardware collective unit implemented on the integrated circuit die, the hardware collective unit comprising a plurality of local buffers, a local buffer in the plurality of local buffers allocated for each of the plurality of shared memory coherence domains, the hardware collective unit further comprising one or more reduce function units that progressively reduce data in the local buffers received from respective shared memory coherence domains, at least one of the one or more reduce function units interfacing to a network interface, the one or more reduce function units comprising a plurality of ALUs, the hardware collective unit further comprising a plurality of collective unit interfaces, each connecting to a corresponding one of the plurality of shared memory coherence domains, the hardware collective unit further comprising a broadcast logic connecting to the plurality of collective unit interfaces;

configuring said hardware collective unit using an operation control configuration logic associated with the hardware collective unit; and performing, by the hardware collective unit, a message passing interface collective operation based on data received from the plurality of shared memory coherence domains according to the control configuration logic, wherein the hardware collective unit combines results from each of the plurality of shared memory coherence domains, and wherein the step of the plurality of shared memory coherence domains on an integrated circuit die communicating with one another includes writing and reading data to and from corresponding data buffers in the hardware collective unit allocated respectively for the plurality of shared memory coherence domains.

2. The method of claim 1, further including a plurality of cores in a shared memory coherence domain using shared memory and associated coherence policy to communicate data among the plurality of cores.

3. The method of claim 1, wherein the step of the plurality of shared memory coherence domains on an integrated circuit die communicating with one another includes individual cores of the plurality of shared memory coherence domains writing and reading data to and from corresponding data buffers in the hardware collective unit allocated respectively for the plurality of shared memory coherence domains.

4. The method of claim 1, wherein a software application programs the control configuration logic.

* * * * *